United States Patent [19]
Schmidt et al.

[11] Patent Number: 5,576,854
[45] Date of Patent: Nov. 19, 1996

[54] LIQUID CRYSTAL LIGHT VALVE PROJECTOR WITH IMPROVED CONTRAST RATIO AND WITH 0.27 WAVELENGTH COMPENSATION FOR BIREFRINGENCE IN THE LIQUID CRYSTAL LIGHT VALVE

[75] Inventors: Jack H. Schmidt, Carlsbad; Ned Nestorovic, San Diego; Rodney D. Sterling, Carlsbad; Joseph M. Haggerty, Fallbrook; Javier A. Ruiz, Oceanside; Robert Edwards, San Marcos; Roger Hollister, Torrance, all of Calif.

[73] Assignee: Hughes-JVC Technology Corporation, Carlsbad, Calif.

[21] Appl. No.: 152,996

[22] Filed: Nov. 12, 1993

[51] Int. Cl.$^6$ ........................ G02F 1/1335; G02F 1/1333
[52] U.S. Cl. ................................. 359/40; 359/73; 359/82; 359/83
[58] Field of Search ................................. 359/40, 41, 73, 359/66, 63, 82, 83

[56] References Cited

U.S. PATENT DOCUMENTS

| | | | |
|---|---|---|---|
| 4,071,912 | 2/1978 | Budmiger | 359/66 |
| 4,408,839 | 10/1983 | Wiener-Avnear | 359/53 |
| 4,466,702 | 2/1985 | Wiener-Avnear et al. | 359/53 |
| 5,042,921 | 8/1991 | Sato et al. | 359/73 |
| 5,121,245 | 6/1992 | Johnson | 359/285 |
| 5,229,872 | 7/1993 | Mumola | 359/40 |
| 5,327,270 | 7/1994 | Miyatake | 359/63 |
| 5,357,370 | 10/1994 | Miyatake et al. | 359/495 |
| 5,446,510 | 8/1995 | Mitsutake et al. | 359/40 |
| 5,459,593 | 10/1995 | Ootaki | 359/40 |

OTHER PUBLICATIONS

Tl–*Technical Information Optical Glass*, "The Stress–Optical Coefficient of Optical Glasses", Nr. 15, Aug. 1984.

*Primary Examiner*—Anita Pellman Gross
*Assistant Examiner*—Walter J. Malinowski
*Attorney, Agent, or Firm*—Harness, Dickey & Pierce, P.L.C.

[57] ABSTRACT

In a liquid crystal light valve projector, a quarter-wave compensator plate is disposed between a polarization plate and a liquid crystal light valve to compensate for polarization irregularities induced by the off-incident reflections in the cone of light projected onto the LCLV. The quarter-wave compensation plate reverses the phase of the P component of said illumination light with respect to said compensator plate by 180° thereby eliminating P-polarization leakage during the dark state of an LCLV projector. The invention also combines the compensator plate with a heat shield and a low stress-optical coefficient counter electrode substrate to reduce the birefringence of the LCLV thereby also minimizing leakage of P-polarized light onto the projection screen during the dark state of the projector.

16 Claims, 5 Drawing Sheets

| MATERIAL | $\rho$ $10^{-6}/°C$ | E $10^3$ N/mm² | K $10^{-6}$ mm²/N | M $10^{-6}$ Δn/°C |
|---|---|---|---|---|
| BK7 | 7.1 | 81 | 2.77 | 1.59 |
| ZKN7 | 4.5 | 71 | 3.62 | 1.16 |
| silica | 0.45 | 70 | 3.61 | 0.11 |
| SF57 | 8.3 | 51 | 0.02 | 0.01 |
| SF6 | 8.1 | 56 | 0.65 | 0.29 |

LIQUID CRYSTAL LIGHT VALVE PROJECTOR WITH IMPROVED CONTRAST RATIO AND WITH 0.27 WAVELENGTH COMPENSATION FOR BIREFRINGENCE IN THE LIQUID CRYSTAL LIGHT VALVE

BACKGROUND OF THE INVENTION

A liquid crystal light valve projector uses an illumination source to shine light onto a polarizer that reflect S-polarized light to a liquid crystal light valve (LCLV). If the LCLV is fully activated then the LCLV converts the S-polarized light to P-polarized light after it is reflected by a dielectric mirror behind the LCLV. The P-polarized light is reflected back to the polarizer, where it passes through the polarizer to the projection screen. If the LCLV segment is not activated then it does not change the polarization of the light and the light remains S-polarized. The S-polarized light is reflected back to the polarizing surface which in turn reflects the light back towards the illumination source. In a perfect system, 100% of the light reflected from the polarizer to the LCLV is S-polarized light. However, the polarizer does not reflect 100% S-polarized light because of geometrically induced errors in the polarizer. Due to the cone of light that is incident on the LCLV all of the light in the cone is not polarized in the S direction by the polarizer with respect to the LCLV. There are small rotations in polarization direction due to the angle of incidence of the light directed onto the polarizing surface. In this situation a higher degree of twist in the polarization axis occurs for a ray with a higher angle of incidence. The direction of rotation of the polarization away from the ideal is dependent upon the angle of incidence of the ray. For example, a ray incident at 5° might rotate the polarization axis by 2° while a ray incident at −5° would rotate the polarization axis by −2°. This geometrical effect is better described in the *Handbook of Optics*, Driscoll, Walter G., 1978, McGraw-Hill, p. 1055–1057.

The light rays with polarizations that have been slightly rotated away from the ideal are reflected by the dielectric mirror in the LCLV and return to the polarizer with their polarization axis still slightly rotated. This causes a slight percentage of these rays to plunge into the polarizer instead of being reflected by the polarizer. This small percentage of light is then projected onto the projection screen. Thus, when the LCLV is completely off or inactivated, a small percentage of the light reflected off the LCLV will not be completely polarized in the S direction with respect to the polarizing surface. This causes unwanted light to pass through the polarizer and slightly illuminate the screen causing the "dark" state to be slightly illuminated which reduces the contrast ratio of the projection system.

Another patent mentions placing a retarder in the same position in a projection system. U.S. Pat. No. 4,466,702 by Weiner-Avnear, et al. describes placing a retarder in a similar system to correct for differences in retardation across the color bandwidth of individual channels in a color projector. This patent requires tuning the birefringence plate to each individual spatial light modulator. This is not an effect that the present invention corrects for.

Another problem associated with a dark or off state of the LCLV projector is the problem of birefringence introduced by thermal gradients across the counter electrode substrate. The light valve itself including the substrate is packaged in an anodized aluminum case to reduce reflections that cause unwanted light scattering. Thus, light striking the case holding the LCLV is absorbed creating heat in the LCLV package. This heat is transferred to the counter electrode substrate which causes the temperature to rise in the substrate creating a thermal gradient across the substrate. This thermal gradient creates birefringence in a BK-7 substrate. This birefringence causes the dark state or off state of the liquid crystal light valve to be "lighter" than desired. Therefore, when the light valve is completely turned off, what should be a totally black screen will actually have some light projected on the screen causing the screen to appear gray instead of a deep black. Therefore, it would be desirable to eliminate the birefringence caused by the thermal gradients across the counter electrode substrate and thereby improve the contrast ratio by making the dark or off state of the LCLV appear black instead of gray on the projection screen.

Another aspect of the problem is the type of material used for the counter electrode substrate. The BK-7 material generates mechanical stresses across the counter electrode substrate as the substrate temperature rises. The degree of stress across the electrode is the primary cause of the birefringence in the substrate. It would therefore be desirable to find a material that has a lower coefficient of stress for a given rise in temperature so that there would be a corresponding decrease in birefringence.

SUMMARY OF THE INVENTION

In a liquid crystal light valve projector, it is desirable to have an off or black level that is as black as possible, with black being defined as the absence of projected light. As the black level darkens, the contrast ratio improves which in turn produces a higher quality projected image. The present invention is a three-part combination which improves the contrast ratio by improving the dark level of the liquid crystal light valve. The elements of the invention can be used alone or in combination to produce a liquid crystal light valve projector that has a superior black level. In this type of liquid crystal light valve projector, light is passed to the projection screen based on its polarization. Light of all polarizations is transmitted from a light source to a polarizer that theoretically only reflects S-polarized light with respect to the LCLV. However, in practice the polarizer also reflects polarized light that is mainly S-polarization but also has a slight P-polarization with respect to the LCLV because of the incident angle of the light reflected from the polarizer. When this light is reflected by the LCLV, the P component has a tendency to leak through the polarizer and finds its way onto the projection screen which raises the black level during the off state. To compensate for this geometrically induced polarization shift a quarter-wave retardation plate is inserted between the polarizer and the LCLV. Light reflected off the polarizer travels through a quarter-wave plate which shifts the phase of the P-polarization by 90°. The light is then reflected off the liquid crystal light valve and again through the quarter-wave plate which shifts the P-polarization phase another 90°. Thus, any light that was initially reflected from the polarizer that had small rotations of its polarization axis, has its P component shifted 180° so that when it strikes the polarizer the phase shift of the P component will correspond to the reverse incident angle of the light that initially struck the polarizer. Because of the shift in the rotation of the polarized light, the light will strike the polarizer in a flat or S manner with respect to the polarizer and will be reflected by the polarizer instead of being transmitted to the screen. This improves the contrast ratio by moving the black level closer to being completely black.

Another aspect of the invention is the use of a heat shield to reduce thermal gradients across the counter electrode substrate. When light is shining on the liquid crystal light valve stray light strikes the black anodized package that holds the liquid crystal light valve. This light is absorbed by the package and has a tendency to heat the light valve case which introduces thermal energy to the counter electrode substrate. As this substrate is heated, the stresses are introduced to the substrate which cause the substrate to have birefringent qualities that degrade the performance of the light valve. To minimize the transmission of thermal energy to the counter electrode substrate, a heat shield is placed in front of the light valve package that is slightly larger than the aperture of the light valve mask. This heat shields absorbs the spill over light preventing it from heating up the counter electrode substrate to the same degree. By diverting heat energy away from the light valve package, the thermal gradients across the counter electrode substrate are reduced which in turn reduces the birefringence of the substrate. Reducing the birefringence increases the contrast ratio by making the off state dark or thereby improving the projected image. In this particular case the glass substrate was a BK-7 substrate produced by Schott.

A further aspect of the invention is the substitution of a SF-57 counter electrode substrate for the BK-7 substrate. It was found that the SF-57 substrate has a low stress optical coefficient. The SF-57 also has low intrinsic birefringence and good transmission of visible light. Because of its low stress optical coefficient, the SF-57 substrate will have less birefringence when exposed to temperature variations. A temperature variation can also cause a problem if the primary and counter electrode materials do not have similar thermal coefficients of expansion. The primary and counter electrodes will try to warp each other and everything in between as the temperature changes causing seal leaks and possibly non-uniform liquid crystal thickness. The SF-57 has a low birefringence when exposed to temperature variations and has a thermal coefficient of expansion that is a good match for the BK-7 material used as the primary electrode substrate. In the present invention, the primary electrode substrate is approximately ½" thick and the SF-57 counter electrode substrate is approximately 0.060" thick. Using the SF-57 counter electrode substrate improves the light valve off state and enhances the use of a quarter-wave compensator plate. The matched thermal coefficients of expansion of the primary and counter electrode contributes to improved performance of the liquid crystal light valve over a wide temperature range rather than a darker off state. Therefore, it is an object of the present invention to provide a polarization based LCLV projector with an improved contrast ratio by making the dark state darker. It is a further object of the present invention to improve the dark state of the projector by cleaning up off-axis light polarization states, with respect to the LCLV, from the main polarizer through use of a quarter-wave plate. Another aspect of the present invention is use of a thermal heat shield to eliminate the transfer of heat from stray light to the LCLV package thereby eliminating thermally induced birefringence across the counter electrode substrate. This improves the dark state of the liquid crystal light valve projector. Finally, it is a further object of the present invention to improve the contrast ratio of the LCLV projector by using a counter electrode substrate that has a low stress optical coefficient. This minimizes thermally induced birefringence in the counter electrode substrate which in turn improves the dark state of the light valve.

These and other objects, features and advantages of the described invention together with the making of the invention will be understood by referring to the following detailed description taken together with the drawings.

DESCRIPTION OF THE PREFERRED EMBODIMENT

The purpose of the present invention is to improve the contrast ratio of a LCLV projector by making the dark state as dark as possible. Light is projected onto the screen of a LCLV projector depending on the polarization of light. Light with all polarizations is projected onto a polarizer which theoretically only projects S-polarized light to the liquid crystal light valve. If the liquid crystal light valve is in its off state, then the mirror behind the liquid crystal segment reflects the S-polarized light back to the polarizing surface which in turn reflects the S-polarized light back in the direction of the light source. If the liquid crystal light valve is on, then it converts the S-polarized light to P-polarized light which is reflected to the polarizer. The polarizer then passes this light to the projection screen. The contrast ratio is partially determined by how black the off state is. In reality, a certain amount of light leaks through the polarizer when the liquid crystal element is supposed to be in its completely off state. This leakage is caused partially by geometrical problems with the polarizer and partly by birefringence in the counter electrode substrate. These imperfections cause the S-polarized light reflected from the LCLV to have a P component with respect to the polarizer which leaks through the polarizer onto the projection screen when this projection screen is supposed to be dark. The present invention shows three ways to reduce these imperfections and improve the contrast ratio for an LCLV projector.

Figure 1:
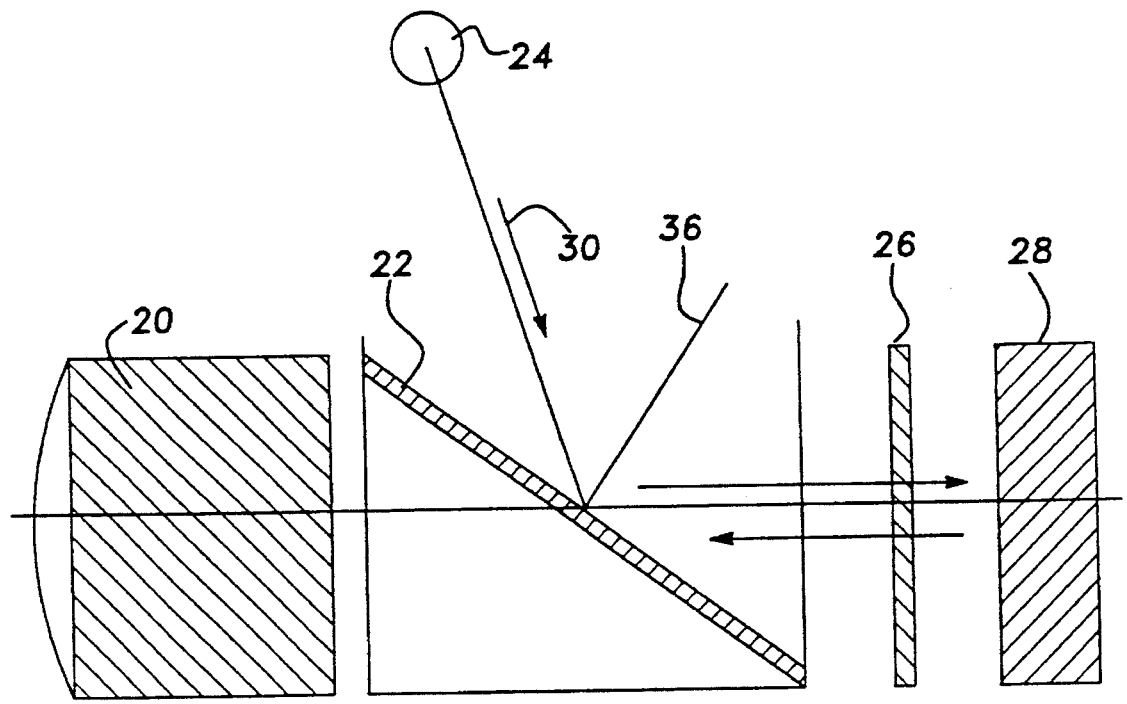
FIG. 1 is a side view of the present invention showing the location of the quarter-wave plate.

FIG. 1 is a diagrammatic side view of a portion of a LCLV projector. Light 30 is transmitted from the illumination source 24 to the surface of polarizing surface 22. The illumination source is set at an angle of incidence that is 54.6° away from the normal angle 36. S-polarized light is reflected by the polarizing surface 22 through the quarter-wave plate 26 to the liquid crystal light valve 28. If the liquid crystal light valve is in the off state, it reflects the S-polarized light back through the quarter-wave plate to the polarizer which reflects the S-polarized light back in the direction of the illumination source 24. If the LCLV 28 is activated or in the on-state then it converts the S-polarized light to P-polarized light which is transferred through the quarter-wave plate 26 and through the polarizing surface 22 to the projection lens 20 which transfers the light to the projection screen (not shown). One aspect of the invention is the placement of a quarter-wave plate 26 between the polarizing surface and the LCLV. The quarter-wave plate 26 is tuned to the center wavelength of the spectrum of the incident light so that the small chromatic errors of the quarter-wave plate are spectrally balanced. The quarter-wave plate 26 does not correct any local birefringence errors in the LCLV nor does it bias the starting point of the LCLV gamma curve. When the fast axis of the quarter-wave plate is perpendicular or parallel to the axis of polarization of the polarizing surface, the quarter-wave plate corrects for small rotations of the polarization state of the S-polarized light (with respect to the LCLV) reflected from the polarizing surface 22. The quarter-wave plate cleans up geometrically induced factors in the polarizer as opposed to correcting problems with the LCLV. The details of this correction will be discussed further below.

If the LCLV 28 does have a small amount of birefringence, then an additional amount of retardance may be added to the quarter-wave plate 26 to compensate for the birefringence in the LCLV. A quarter-wave plate with an additional retardance of 0.02 (for a total of 0.27) can be used to compensate both for the geometrical imperfections of the polarizing surface 22 as well as for the birefringence error induced by the counter electrode substrate of the LCLV 28. The birefringence of the LCLV counter electrode will be discussed further in conjunction with FIGS. 7, 8, 9 and 10. It is important to note that as the birefringence in the LCLV is eliminated, less additional retardance would be necessary. For instance, a perfect LCLV with no birefringence would work better with a true quarter-wave plate rather than a 0.27 quarter-wave plate.

Figure 2:
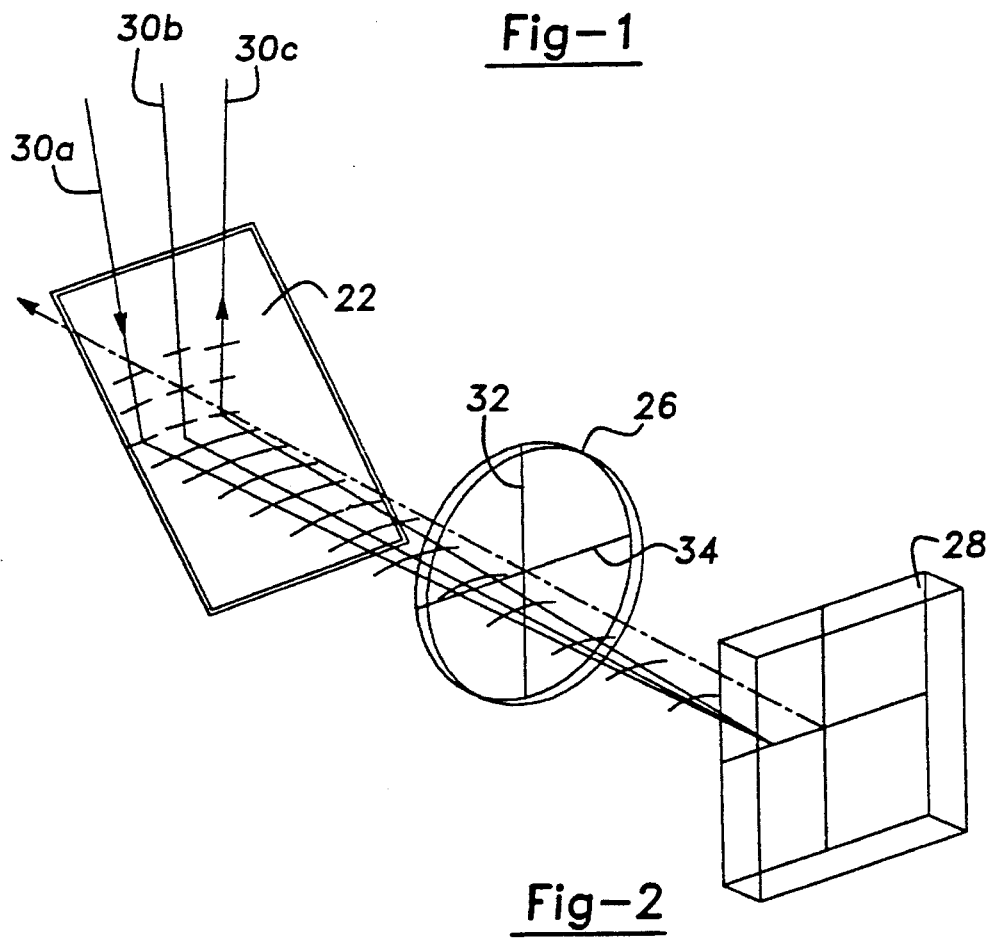
FIG. 2 is a prospective view of the invention showing the location of the quarter-wave plate.

Turning now to FIG. 2, FIG. 2 shows a perspective view of the polarizing surface 22, the quarter-wave plate 26 and the LCLV 28. The quarter-wave plate 26 is oriented so that its fast axis 32 is perpendicular to the axis of polarization of the polarizing surface 22. It should be noted at this point that the fast axis of the quarter-wave plate 26 can be either perpendicular or parallel to the axis of polarization of the polarizing surface because any P-polarized light will still have its phase shifted by 180°.

From the prospective of the LCLV 28, any point on the active surface of the LCLV will see the same cone of light as partially represented by light rays 30a, 30b and 30c. Light ray 30b is in the center of the cone and is 100% S-polarized with respect to the planes of the quarter-wave plate 26 and the LCLV 28 as it is reflected from the polarizing surface 22. However, ray 30a has a small rotation in polarization direction due to the angle of incidence of the light on the polarizing surface 22. A higher degree of twist in the polarization axis occurs for a ray with a higher angle of incidence. Also, the direction of rotation is dependent on the angle of incidence. For example, a ray incident at 5° might rotate the polarization axis by 2° while a ray incident at −5° would rotate the polarization axis by −2°. Since ray 30a is travelling to the polarization plate 22 from the illumination source 24 at a slight angle, it has a slight degree of P-polarization with respect to the polarization plate 22. The P-polarized light of ray 30a is passed through the polarizing surface 22 and the S-polarized component of ray 30a is reflected toward the quarter-wave plate with a slightly rotated plane of polarization with respect to the quarter-wave plate 26. As ray 30a passes through the quarter-wave plate 26 the P component of that ray with respect to the polarizing surface 22 has its phase shifted by 90°. This ray is reflected off of the liquid crystal light valve (assuming the light valve is in the off state) and the P component of that ray has its phase shifted by another 90° as it again passes through the quarter-wave plate 26. This results in ray 30c which has the phase of its P component rotated by 180° with respect to ray 30a. This gives ray 30c the opposite rotation of the plane of polarization as ray 30a which means ray 30c will be effectively 100% S-polarization at the angle at which it reflects off of polarizing surface 22. Since there is effectively no P component with respect to the polarizing surface 22, no P-polarized light will be transferred through the polarizing surface to the projection screen. The elimination of this leakage improves the contrast ratio and therefore the quality of the projected image. The effect of the quarter-wave plate on the light reflected from the polarizing surface 22 will be further discussed with reference to FIGS. 3A, 3B, 4A, 4B, 5 AND 6.

Figure 3A:
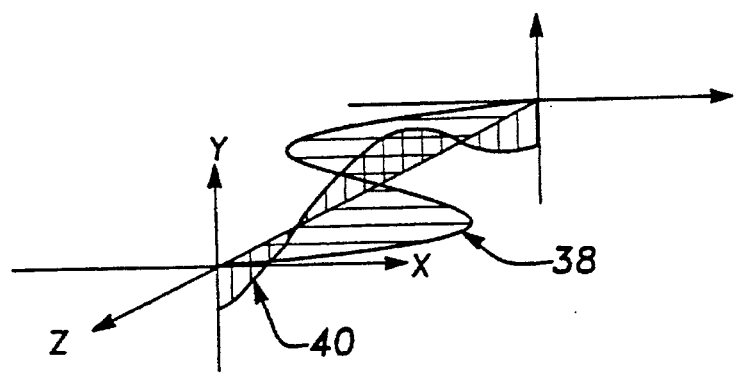
FIGS. 3A and 3B diagrammatically show the effect of the quarter-wave plate on S-polarized light with a slightly rotated axis with respect to the quarter-wave plate.
Figure 3B:
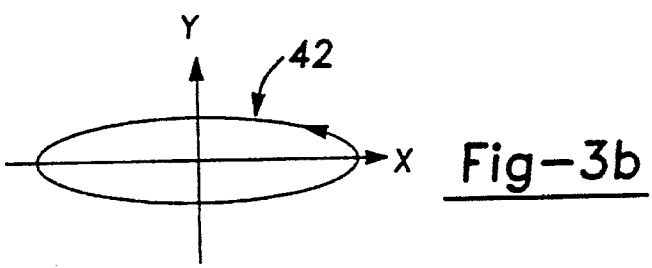

FIG. 3A is a diagram showing the effect of the quarter-wave plate on light having a large S component and a small P component. The quarter-wave plate has its fast axis perpendicular to the axis of polarization of the polarizing surface. Line 38 shows the phase of the light polarized in the S direction with respect to the axis of the quarter-wave plate. Line 40 shows the light polarized in the P direction with respect to the quarter-wave plate. Line 38 represents light polarized along the fast axis and line 40 represents light polarized along the slow axis. As can be seen from this diagram, the phase of the P polarized light has been shifted by 90° after it has passed through the quarter-wave plate 26 shown in FIG. 2. This causes the elliptical polarization chart 42 shown in FIG. 3B. After a ray reflects from the LCLV it again passes through the quarter-wave plate where the phase of the P-polarized light is again shifted by another 90°. The total shift for the round trip through the quarter-wave plate is 180°. FIGS. 4A, 4B, 5 and 6 further illustrate this concept.

Figure 4A:
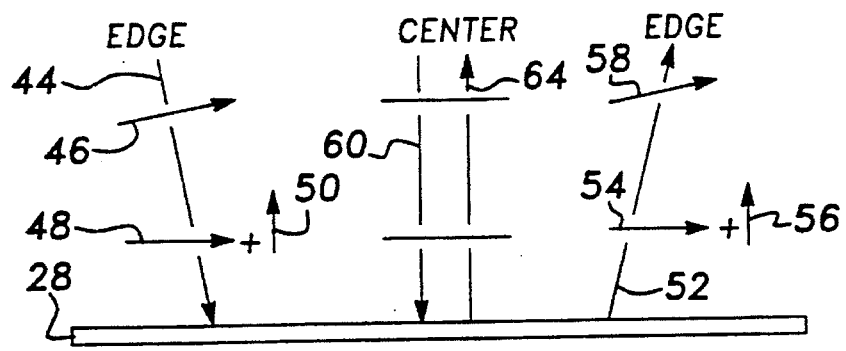
FIGS. 4A and 4B illustrate a corrective function of the quarter-wave plate on light reflected from the polarizer.
Figure 4B:
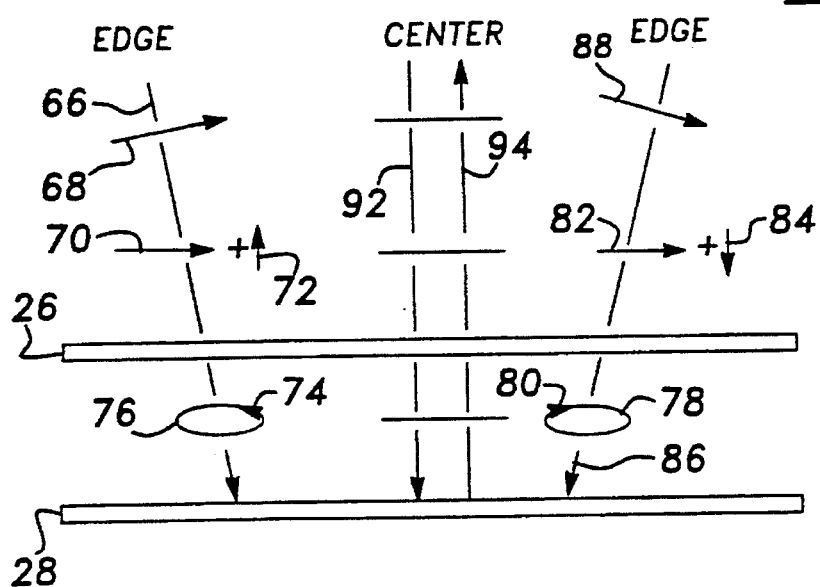
Figure 5:
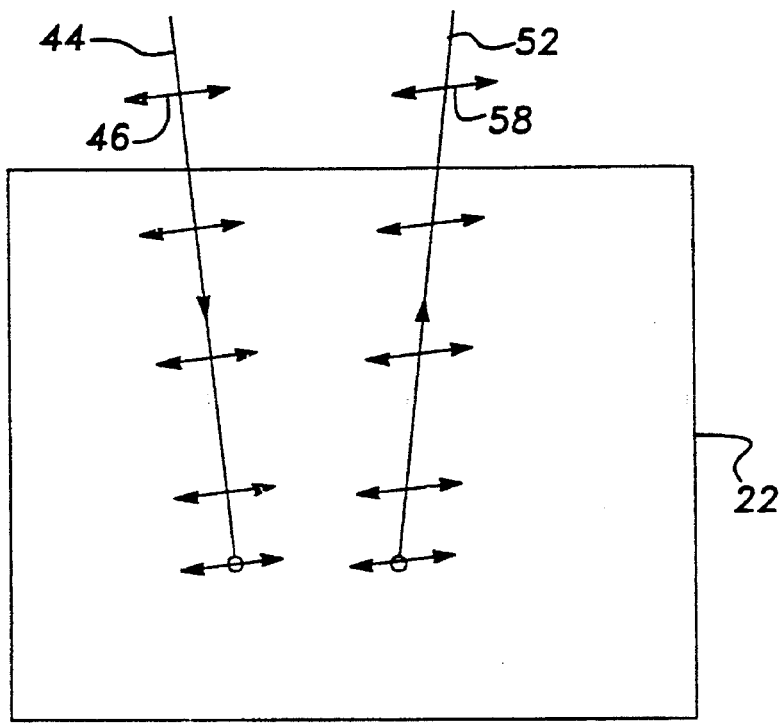
FIG. 5 illustrates the rotation of the polarized light reflected from the polarizer from the prospective of the LCLV when a quarter-wave plate is not used.
Figure 6:
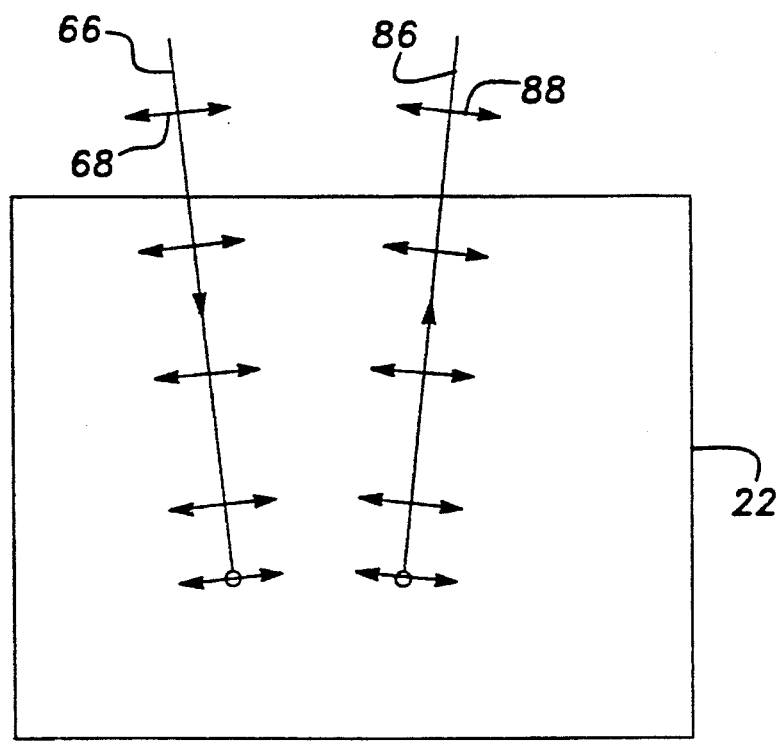
FIG. 6 shows the corrective effect of the quarter-wave plate.

FIG. 4A and FIG. 5 represent light rays that are reflected without the use of the quarter-wave plate and FIGS. 4B and FIG. 6 represent light that is reflected through a quarter-wave plate. With reference to FIG. 4A, incident ray 44 represents the ray on the edge of the light cone referred to previously. Arrow 46 represents the orientation of the polarization of ray 44 as it is reflected off of the polarizer 22. Arrows 48 and 50 represent respectively the S and P components of ray 44. When ray 44 is reflected off of the LCLV 28 it is represented exiting ray 52. The S and P components of exiting ray 52 are shown by arrows 54 and 56 respectively. Arrow 58 represents the combination of the S and P components 54 and 56. After ray 52 is reflected from the LCLV 28, it strikes the polarizing surface 22 shown in FIG. 5. The P component 56 of ray 52 has the same phase as P component 50 of ray 44. However, ray 52 is striking the polarizing surface at the reverse incident angle which means that a portion of ray 52 will be P-polarized with respect to the angle at which it strikes the polarizing surface 22. The P portion of ray 52 will then pass through the polarizer and raise the dark level of the projection screen. FIG. 5 shows the same rays 44 and 52 as shown in FIG. 4A from the prespective of the LCLV. Incoming 60 and outgoing 64 rays are on-axis rays which correspond to off-axis rays 44 and 52, respectively.

In FIG. 4B, ray 66 is shown as it is reflected off of the polarizer 22. Ray 66 has a polarization axis represented by arrow 68 and further represented arrows 70 and 72 which respectively represent the S-polarization and P-polarization components of ray 66. The arrow 72 is pointing up to indicate the phase orientation of the P component of ray 66.

When ray 66 passes through the quarter-wave plate 26, the phase of the P-polarized light is shifted by 90° as indicated by ellipse 76 which indicates that the phase arrow 74 is pointing counterclockwise. As ray 66 is reflected off of LCLV 28, it is represented as ray 86. Ellipse 78 is the same as ellipse 76 except that the phase arrow 80 is now pointing clockwise. When ray 86 passes through polarizer 26, the P-polarized light is again shifted in phase by 90° which is shown by arrow 84. The S component is shown by arrow 82. Arrow 84 shows a 180° phase shift for the P component as compared to arrow 72 of ray 66. Arrow 88 represents the combined S and P polarization. Ray 86 will now strike the polarizer 22 such that ray 86 is effectively 100% S-polarized with respect to its incident angle to the polarizer 22. Since there is no P component at the angle ray 86 strikes the polarizer 22 the amount of the P-polarized light leaking through the polarizing surface 22 during the off state is greatly minimized. The polarization vectors shown in FIG. 6, namely polarization vector 68 and 88 correspond to the polarization vectors 68 and 88 in FIG. 4B. Other aspects of the invention will now be discussed with respect to FIGS. 7, 8, 9 and 10. Incoming 92 and outgoing 94 rays are on-axis rays which correspond to off-axis rays 66 and 86, respectively.

Figures 7, 8:
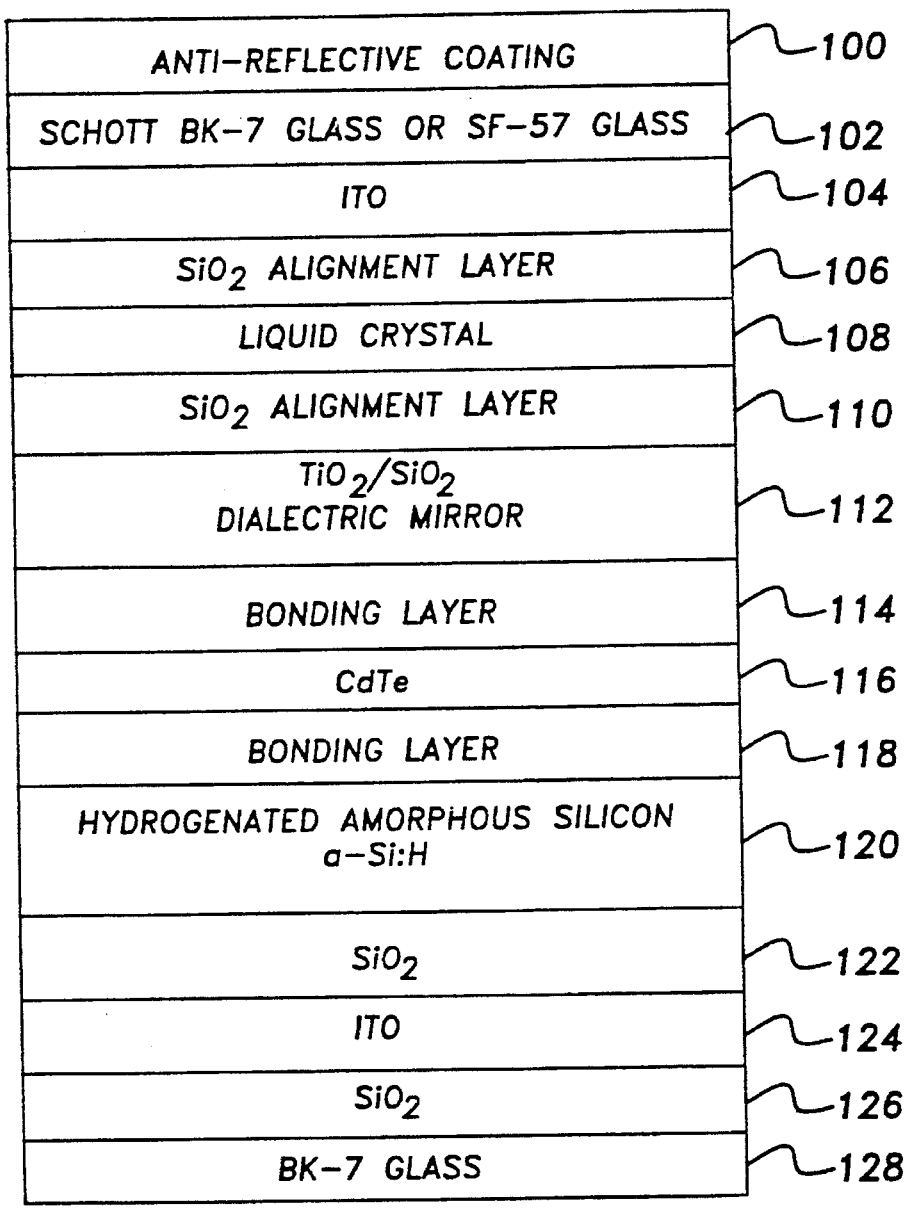
FIG. 7 is a block diagram of a liquid crystal light valve showing the location of the counter electrode substrate.
FIG. 8 is a table showing the relative merits of different materials for use as a counter electrode substrate.

The next aspect of the invention relates to eliminating birefringence in the counter electrode substrate. FIG. 7 shows a block diagram construction of a liquid crystal light valve having a BK-7 Glass primary electrode substrate 128 for supporting the primary electrode layer 124. Other aspects of the construction of the liquid crystal light valve shown in FIG. 7 are more fully disclosed in an application filed by Rodney D. Sterling and Yu-Tail Lee entitled "Silicon Dioxide Bonding Layers and Method" filed on Nov. 8, 1993 by Express Mail HB072131147 which is hereby incorporated by this reference.

Figure 9:
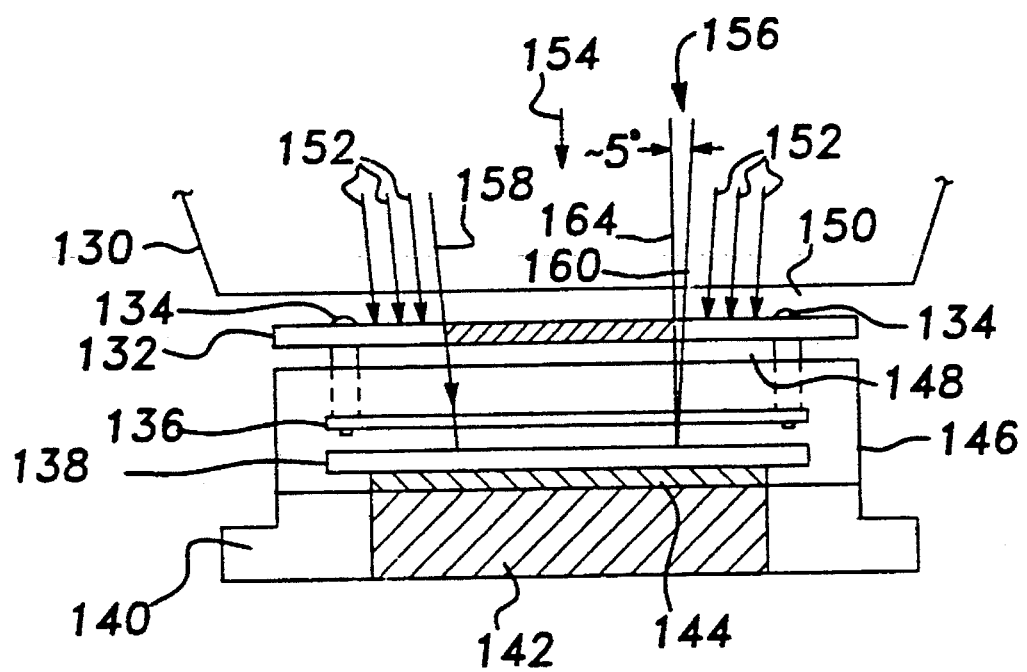
FIG. 9 is a side view of a liquid crystal light valve assembly having a heat shield.
Figure 10:
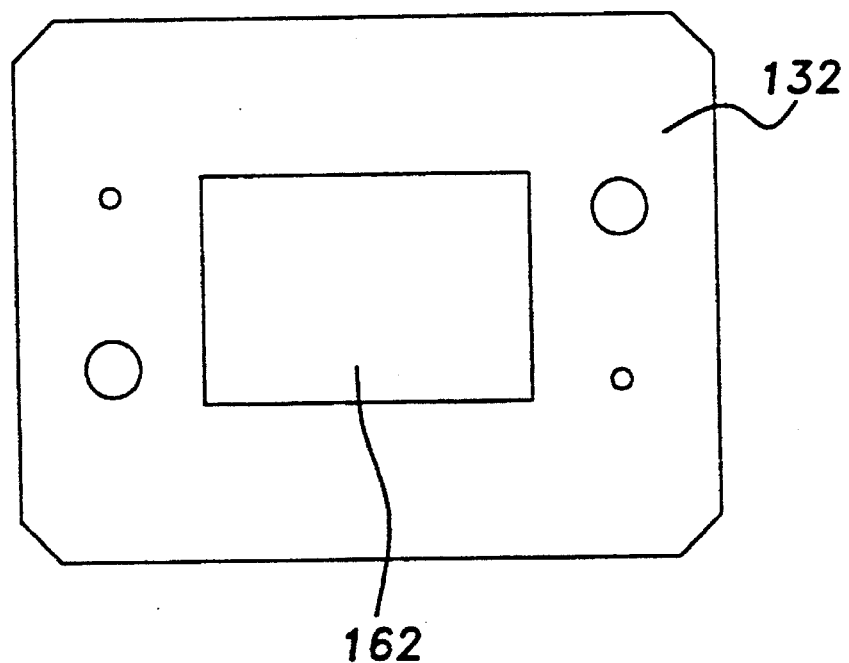
FIG. 10 is a top view of the heat shield of the present invention.

FIG. 7 is a side view showing the layers of the liquid crystal light valve. The counter electrode 104 is supported by the counter electrode substrate 102. Normally the counter electrode substrate 102 was constructed from Schott BK-7 Glass. The other layers of the light valve comprise counter electrode layer 104, alignment layer 106, liquid crystal layer 108, alignment layer 110, dieelectric layer 112, bonding layer 114, cadmium telluride layer 116, bonding layer 118, a-Si:H layer 120, SiO$_2$ layer 122, primary electrode layer 124, SiO$_2$ 126 and primary electrode substrate layer 128. The counter electrode substrate layer 102 was normally constructed of Schott BK-7 Glass. However, this material is susceptible to thermal gradients which in turn caused stresses inside the counter electrode substrate 102 which caused birefringence. The birefringence in the counter electrode substrate caused some of the reflected S-polarized light to become P-polarized during the off state of the light valve which in turn caused degradation of the contrast ratio and the quality of the projected image. In order to reduce the birefringence in the current BK-7 counter electrode substrate 102, a reduction in the thermal gradients in the glasses was needed. The light valve package, shown in more detail in FIG. 9, is black anodized to reduce stray reflections. This causes the light striking the case to be absorbed, thus creating heat. The glass itself is transparent and sees minimal heating. However, the absorbed heat is transferred to the counter electrode substrate 102 which causes the glass to become birefringent.

The process by which a change in temperature causes birefringence will now be discussed. A change in temperature does not directly change the refractive index of the material. The change causes dimensional change in the part through its thermal expansion coefficient. If the temperature is nonuniform or if the part is constrained the part will experience stress. This stress, in turn, causes a change in the refractive indices (parallel and perpendicular to the stress) through the photoelastic affect and the stress-optical coefficients. The difference in the refractive indices determines the birefringence which in turn determines the darkness of the dark state. The birefringence can be minimized by minimizing the thermal expansion coefficient or by finding stress-optical coefficients such that the difference in refractive indices is minimized. The refractive indices themselves have no effect, however, the differences between refractive indexes does. FIG. 8 is a calculation of a figure of merit that has been used to determine the suitability of materials for use as a counter electrode substrate in an environment of thermal heating and where a BK-7 primary substrate is being used. In FIG. 8, P is the thermal expansion coefficient, E is the modulus of elasticity, K is the stress-optical coefficient and the units of M are index-difference temperature change. In FIG. 8, $M=pEK$.

From FIG. 8 it is clear that the fused silica has low thermally induced stressed birefringence because of its low thermal expansion coefficient and not because of its stress-optical coefficient. SF-57, on the hand, has low thermally induced stress birefringence because its stress-optical coefficient is almost zero. Also, its thermal coefficient of expansion is a much better match with BK-7 as opposed to the silica or ZKN7. A temperature range can cause problems if the primary and counter electrode materials do not have similar thermal coefficients of expansion. The two materials will try to warp each other and everything in between as the temperature changes, causing seal leaks and possibly non-uniform liquid crystal thickness. The advantage of matched thermal coefficients of expansion is longer LCLV life over a wide temperature range rather than a darker off state.

SF-57 does have drawbacks in that it contains more bubbles than BK-7, ZKN7 or silica. However, it can be selected for very low bubble content for the size that will be useful in the present invention. Also SF-57 has poor acid resistance and must be coated on the exterior side. Therefore, by selecting SF-57 as the counter electrode substrate 102, the birefringence will be reduced over the thermal range of the LCLV. This is true because it reduces the amount of thermally induced stress birefringence. Therefore, by substituting SF-57 Glass for BK-7 Glass, the amount of birefringence thermally induced into the counter electrode substrate is reduced thereby increasing the contrast ratio and improving the quality of the projected images.

A final aspect of the invention relates to adding a heat shield in front of the LCLV package to prevent heat from being absorbed into the counter electrode substrate 102 (FIG. 7) and the LCLV package in general. FIG. 9 is a side view of the LCLV package showing the location of the heat shield. FIG. 9 shows the front of the prism 130 which acts as the primary polarizer previously referred to above. The heat shield 132, also shown in FIG. 10 as a top view, is anodized per MIL-A-8625 type II CL 2 black boiling water and not using sodium dichromate. The heat shield 132 has a rectangular area 162 in its approximate center allowing light rays 154, 158 and 160 to pass through to the counter electrode substrate 138. The counter electrode substrate 138 corresponds to the counter electrode substrate 102 in FIG. 7. Stray light rays 152 pass out of the main polarizer 130 and strike the black anodized surface of the heat shield 132. The absorption of this light causes the temperature of the heat shield to rise. The heat shield is cooled by a fan (not shown) that blows air through air gaps 148 and 150 which are approximately 0.030" wide. This passing air causes heat to be removed from the heat shield 132. Heat shield 132 is attached to the dust cover 146 and the aperture 136. The aperture and dust cover are anodized in the same manner as the heat shield. The counter electrode 138, the intermediate layers 144 represented by the layers 104–126 in FIG. 7, and primary electrode 142 are securely connected to the base 140 which in turn is connected to the dust cover 146. The base 140 is also black anodized in the same manner as the heat shield.

With the heat shield 132 in place, stray light 152 is blocked, absorbed and removed and illumination light from the polarizer is allowed to pass through opening 162 (FIG. 10) and impinge upon the counter electrode 138. The rectangular open space 162 of the heat shield 132 is slightly larger than the rectangular opening of the aperture plate 136 in order to improve the quality of the image transferred by the edges of the liquid crystal light valve. The opening 162 of the heat shield 132 is calculated by using the cone angle of the optical system which gives the angle of approximately 5° as shown by angle 156 with ray 164 being normal to the surface plane of the counter electrode substrate 138. The absorption of the stray light 152 by the heat shield 132 also prevents heating of the aperture mask 136 which in turn avoids heat of the counter electrode 138.

It was previously learned that reducing the size of the aperture opening of aperture 136 caused the aperture to absorb twice as much light energy as the original aperture. The size of the aperture opening had been reduced to improve the sharpness of the images projected by the edge of the liquid crystal light valve. Thus, the heat shield 132 was designed to eliminate heating of the aperture 136 by stray light. To further enhance heat transfer from the aperture mask 136 to the cover glass frame 146, the aperture mask 136 to cover glass frame contact is not anodized.

Of the anodized parts, including the aperture plate, the dust cover and the heat shield, if the anodizing was removed from the mating sections that were part of the heat transfer path then birefringence was also reduced. Also, placement of the aperture mask 136 and the large aperture of the counter electrode substrate 138 combined with the above placement of the heat shield resulted in stable acceptable operation.

With the external heat shield 132 in place the overall package temperature was cool in the range of the 25°–30° C. and the shield was clearly hotter than the remaining package by 5°–10° C.

While the preferred embodiments of the invention have been described above, it will be recognized and understood that various changes and modifications may be made therein and the appended claims are intended to cover all such modification which may fall within the spirit and scope of this invention.

What is claimed is:

1. A polarization based projection system comprising:
   an illumination source for providing illumination light,
   polarization means disposed adjacent to said illumination means for directing polarized light from said illumination source,
   liquid crystal light valve means disposed adjacent to said polarization means for receiving polarized light reflected from said polarization means, said liquid crystal light valve being capable of altering the polarization state of the polarized illumination light reflected from said polarization means,
   projection lens for projecting light transferred from said liquid crystal light valve means through said polarization means to said projection lens for projecting an image on a screen,
   compensator means disposed between said polarization means and said liquid crystal light valve means for changing the phase angle of the polarized light reflected from said polarization means through said compensator means to said liquid crystal light valve means and back through said compensator means to said polarization means wherein said compensator means has shifted the polarization of said reflected light so that said reflected light has a phase shift in its polarization of approximately 180°; and
   wherein said compensator means has a total retardance of greater than 0.25, wherein the additional retardance above 0.25 compensates for birefringence in the liquid crystal light valve means.

2. The polarization based projection system of claim 1 wherein said compensator means has its fast axis perpendicular or parallel to the axis of polarization of the polarization means.

3. A polarization based projection system comprising:
   an illumination source for providing illumination light,
   polarization means disposed adjacent to said illumination means for directing polarized light from said illumination source,
   liquid crystal light valve means disposed adjacent to said polarization means for receiving polarized light reflected from said polarization means, said liquid crystal light valve being capable of altering the polarization state of the polarized illumination light reflected from said polarization means,
   projection lens for projecting light transferred from said liquid crystal light valve means through said polarization means to said projection lens for projecting an image on a screen,
   said liquid crystal light valve means having a counter electrode means having low thermally induced stress birefringence and a low stress-optical coefficient,
   compensator means disposed between said polarization means and said liquid crystal light valve means for changing the phase angle of the polarized light reflected from said polarization means through said compensator means to said polarization means wherein said compensator means has shifted the P-polarization of said reflected light so that said reflected light has a phase shift in its P-polarization of approximately 180°; and
   wherein said compensator means has a total retardance of greater than 0.25, wherein the additional retardance above 0.25 compensates for birefringence in the liquid crystal light valve means.

4. The polarization based projection system of claim 3 wherein said counter electrode means includes a counter electrode substrate made from SF-57 glass.

5. A polarization based projection system comprising:
   an illumination source for providing illumination light,
   polarization means disposed adjacent to said illumination means for directing polarized light from said illumination source,
   liquid crystal light valve means disposed adjacent to said polarization means for receiving polarized light reflected from said polarization means, said liquid crystal light valve being capable of altering the polarization state of the polarized illumination light reflected from said polarization means,
   projection lens for projecting light transferred from said liquid crystal light valve means through said polarization means to said projection lens for projecting an image on a screen, heat shield means located between said polarization means and said liquid crystal light valve means including an outer portion defining a first opening, said first opening for transmitting light to said light valve and said outer portion for absorbing stray light to reduce the temperature transferred to the liquid crystal light valve means thereby reducing the birefringence of said liquid crystal light valve means.

6. The polarization base projection system of claim 5 including compensator means disposed between said polarization means and said liquid crystal light valve means for changing the phase angle of the polarized light reflected from said polarization means through said compensator means to said liquid crystal light valve means and back through said compensator means to said polarization means wherein said compensator means has shifted the P-polarization of said reflected light so that said reflected light has a phase shift in its P-polarization of approximately 180°.

7. The polarization based projection system of claim 5 including:

said liquid crystal light valve means having a counter electrode means including a substrate having low thermally induced stress birefringence and a low stress-optical coefficient.

8. The polarization base projection system of claim 7 wherein said counter electrode means substrate is SF-57 glass.

9. The polarization base projection system of claim 8 wherein said compensator means is a quarter-wave plate.

10. The polarization base projection system of claim 7 wherein said counter electrode means substrate is BK-7 glass.

11. The polarization based projection system of claim 6 wherein said compensator means has a total retardance of greater than 0.25 wherein the additional retardance above 0.25 compensates for birefringence in the liquid crystal light valve means.

12. A polarization based projection system comprising:

a source of light;

polarization means for receiving said light and for producing polarized light therefrom;

a light valve located adjacent said polarization means for modulating said polarized light; and a heat shield, located between said light valve and said polarization means and including an outer portion defining a first opening, said first opening for transmitting light to said light valve and said outer portion for absorbing stray light to reduce the temperature and birefringence of said light valve.

13. The polarization based projection system of claim 12 further comprising:

an aperture plate defining a second opening and being located between said light valve and said heat shield, wherein said first opening is larger than said second opening and said heat shield reduces heating of said aperture plate.

14. The polarization based projection system of claim 13 wherein the differences in size between said first and second openings is related to a cone angle of light produced by said source.

15. The polarization based projection system of claim 13 further comprising a dust cover, wherein said heat shield and said aperture plate are coupled to said dust cover.

16. The polarization based projection system of claim 12 wherein said outer portion of said heat shield is anodized.

* * * * *